United States Patent [19]

Nooyen et al.

[11] Patent Number: 5,773,547
[45] Date of Patent: Jun. 30, 1998

[54] ETHYLENE POLYMER HAVING AN INTRINSIC VISCOSITY OF AT LEAST 4 DL/G AND A METHOD FOR THE PREPARATION THEREOF

[75] Inventors: Godefridus A. H. Nooyen, Helden; Hendrikus Oostra, Susteren, both of Netherlands

[73] Assignee: DSM N.V., Heerlen, Netherlands

[21] Appl. No.: 256,935

[22] PCT Filed: Jan. 26, 1993

[86] PCT No.: PCT/NL93/00026

§ 371 Date: Oct. 7, 1994

§ 102(e) Date: Oct. 7, 1994

[87] PCT Pub. No.: WO93/15118

PCT Pub. Date: Aug. 5, 1993

[30] Foreign Application Priority Data

Jan. 28, 1992 [NL] Netherlands ............................ 9200150
Mar. 23, 1992 [NL] Netherlands ............................ 9200530

[51] Int. Cl.[6] .......................... C08F 10/02; C08F 110/02
[52] U.S. Cl. ........................................ 526/352; 526/124.2
[58] Field of Search ............................ 526/123, 124.2, 526/352; 264/288.4

[56] References Cited

U.S. PATENT DOCUMENTS

| 4,311,817 | 1/1982 | Morita et al. ............................ 526/124 |
|---|---|---|
| 4,879,076 | 11/1989 | Sano et al. ................................ 264/28 |
| 5,036,148 | 7/1991 | Chanzy et al. ........................ 526/169.2 |
| 5,070,051 | 12/1991 | Masi et al. .................................. 502/9 |

FOREIGN PATENT DOCUMENTS

| 0212519 | 3/1987 | European Pat. Off. . |
|---|---|---|
| A2030750 | 8/1987 | European Pat. Off. . |
| 2107605 | 3/1990 | Japan . |

*Primary Examiner*—David W. Wu
*Attorney, Agent, or Firm*—Cushman Darby & Cushman IP Group of Pillsbury Madison & Sutro, LLP

[57] ABSTRACT

The invention relates to an ethylene polymer having an intrinsic viscosity of at least 4 dl/g, which has a maximum draw ratio of at least 20, is pulverulent, has a bulk density of at most 300 kg/m$^3$ and has an amount of catalyst residues of less than 50 ppm. The invention also relates to a method for the preparation of a pulverulent ethylene polymer having an intrinsic viscosity of at least 4 dl/g through polymerization of ethylene or of a mixture of ethylene and not more than 2 mol% higher olefins at a temperature below 80° C. and an ethylene pressure below 0.2 MPa in the presence of a catalyst having a specific surface area of at most 150 m$^2$/g. It further relates to articles composed of the ethylene polymer.

9 Claims, No Drawings

ETHYLENE POLYMER HAVING AN INTRINSIC VISCOSITY OF AT LEAST 4 DL/G AND A METHOD FOR THE PREPARATION THEREOF

The invention relates to an ethylene polymer having an intrinsic viscosity of at least 4 dl/g and a method for the preparation thereof. An ethylene polymer of this type is disclosed in WO 87/03288. The ethylene polymer described in this publication can be stretched at temperatures below its melting point. To this end, the polymer is compressed to form a film, which can be stretched to at least 15 times its size at temperatures of 60°–145° C. The stretched articles have a tensile strength of greater than 15 g/den (1.3 GPa) and a modulus of elasticity of greater than 500 g/den (45 GPa). The ethylene polymer is prepared through polymerisation of ethylene in the presence of a vanadium-containing catalyst at temperatures of, for example, −40° C. to 20° C. and pressures of less than 0.2 MPa absolute pressure. The polymerisation is carried out in the presence of a homogeneous vanadium catalyst or a vanadium catalyst applied to a support.

If the ethylene polymers according to WO 87/03288 are prepared using a homogeneous vanadium catalyst, the shape of the polymer obtained is irregular. The polymer has the macroscopic form of fragments and threads having dimensions of the order of one centimeter. Ethylene polymer in such a form is not or barely processable on an industrial scale.

If the ethylene polymers according to WO 87/03288 are prepared using a heterogeneous vanadium catalyst, such as a vanadium catalyst on a silica support (see the examples in WO 87/03288), the amount of catalyst residues in the polymer is high. In the examples this is 56–2310 ppm of vanadium. Such high contents of catalyst residues are undesirable. The amount of catalyst residues is calculated in a known manner from the polymer yield and the amount of active catalyst component (vanadium or titanium) which is supplied to the reactor.

According to WO 87/03288, comparative experiment F, titanium-containing catalysts having a high catalytic activity give a polymer which is not readily stretchable. The maximum degree of stretching is 5 at a stretching temperature of 100° C.

According to the invention there is provided an ethylene polymer which has a maximum draw ratio of at least 20, is pulverulent, has a bulk density of at most 300 kg/m$^3$ and has an amount of catalyst residues of less than 50 ppm.

It has been found that some catalysts, under specific conditions during polymerisation, lead to a highly stretchable ethylene polymer, specifically when the polymerisation of ethylene or of a mixture of ethylene and not more than 5 mol% higher olefins is carried out at a temperature of at most 80° C. and an ethylene pressure of at most 0.2 MPa in the presence of a transition metal catalyst having a specific surface area of at most 150 m$^2$/g. Preferably, the specific surface area is at most 50 m$^2$/g and more particularly at most 10 m$^2$/g. The specific surface area is determined with the aid of ASTM standard D 3663–78. Pressures are indicated as absolute pressure in Pa.

The catalysts which are used according to the invention are transition metal catalysts known under the name Ziegler catalysts. Catalysts of this type can be prepared in a known manner. The following may be mentioned as transition metals which can occur in the Ziegler catalysts: vanadium, titanium, zirconium, hafnium and chromium. Preferably, the catalyst according to the invention is a titanium-containing catalyst having a high catalytic activity. Preferably, the catalysts which are used according to the invention have a yield of more than 800 g of polyethylene/g of catalyst under polymerisation conditions such that the ethylene pressure is 0.07 MPa and the polymerisation temperature 60° C. Preferably, the catalysts are applied to a support which contains magnesium, more specifically magnesiumchloride. Preferably, the Mg/Ti molar ratio in such a catalyst is at least 5 and in particular at least 10. The following may be mentioned as examples of very suitable catalysts: UM-1$^R$ from Toho Titanium and Lynx 715$^R$ from Catalyst Resources Inc.

The invention further relates to a method for the production of a pulverulent ethylene polymer. EP-A-0358264 teaches such a method of production in the presence of a catalyst having a low surface area (e.g. 32 m$^2$/g). However the polymerization temperature in the examples is higher than 80° C. and the polymerization pressure is much higher than 0.2 Mpa. Under these conditions no readily stretchable polymer is obtained.

The catalysts according to the invention can be used in a known manner. According to the invention, polymerisation can be carried out in a slurry process or in a gas phase process. Inert solvents such as hexane, heptane and kerosene can be used as dispersing agents. Known co-catalysts, such as organoaluminium compounds or dialkyl compounds of, for example, Mg, Zn or Cd can be used. In this context see, for example, EP-A-114526, page 16, line 20 to page 18, line 22.

According to the invention, the temperature during polymerisation is at most 80° C. If the polymerisation temperature is too high, a polymer is obtained which is not readily stretchable. Preferably, the polymerisation temperature is at most 70° C.

The ethylene pressure during polymerisation is at most 0.2 MPa, preferably at most 0.15 MPa and in particular at most 0.1 MPa. If the ethylene pressure is too high, a polymer is obtained which is not readily stretchable.

It has been found that a stretchable ethylene polymer which can be obtained according to the invention is pulverulent, has a bulk density of at most 300 kg/m$^3$ and contains an amount of catalyst residues of less than 50 ppm. If the bulk density is higher than 300 kg/m$^3$, the maximum degree of stretching is adversely affected. Preferably, the ethylene polymer has a bulk density of at most 250 kg/m$^3$. More particularly, the ethylene polymer according to the invention has a bulk density of at most 200 kg/m$^3$. The bulk density of polymer powder is determined in accordance with DIN 53466/A, and the particle size of pulverulent catalyst is determined with the aid of laser light diffraction in a Malvern$^R$ particle size analyser.

The ethylene polymer according to the invention can further be characterized in that it has a lamella thickening factor of more than 1.5, measured after a thermal treatment of 75 hours at 125° C. The lamella thickness can be determined using transmission electronmicroscopy. For the determination of the lamella thickening factor Q as defined according to the invention, the lamella thickness is measured of a sample of the ethylene polymer as polymerized ($L_b$) and is also measured after a thermal treatment of the sample of 75 hours at 125° C. ($L_a$). The lamella thickening factor Q is defined as $(L_a-L_b)/L_b$. It was found that a small lamella thickening factor leads to a material which is not readily stretchable. Preferably the ethylene polymer has a lamella thickening factor of at least 2.0.

The ethylene polymer obtained according to the invention is pulverulent instead of in the form of fragments or threads, such as are obtained using the homogeneous vanadium catalysts according to WO 87/03288. The polymerisation takes place with a relatively high catalyst activity. The amount of catalyst residues is low, specifically less than 50 ppm. The amount of catalyst residues is calculated from the polymer yield and the amount of active catalyst component metered in is expressed in ppm with respect to the total amount of polymer. In particular, the amount of catalyst residues is less than 25 ppm.

The intrinsic viscosity of the ethylene polymer according to the invention, determined in decalin at 135° C. in accordance with ASTM standard D 4020, is at least 4 dl/g. The relative viscosity is in particular 8–40 dl/g. The ethylene polymer is a linear polyethylene having fewer than 10 side chains per 1,000 carbon atoms and preferably having fewer than 3 side chains per 1,000 carbon atoms, or a polyethylene of this type which also contains minor amounts, preferably less than 5 mol% and in particular less than 1 mol%, of one or more other alkenes copolymerised therewith, such as propylene, butene, pentene, hexene, 4-methylpentene, octene and the like. The polyethylene can also contain minor amounts, preferably at most 25% by weight, of one or more other polymers, in particular a 1-alkene polymer, such as polypropylene, polybutene or a copolymer of propylene with a minor amount of ethylene.

According to the invention a stretchable ethylene polymer is understood to be an ethylene polymer having a maximum draw ratio of at least 20. According to the invention, the maximum draw ratio is determined as follows. A layer of ethylene polymer powder 2 mm high is compressed in a circular mould having a diameter of 5 cm for 5 minutes at room temperature under a weight of 50,000 kg. The circular film obtained is then post-pressed at 130° C. for 10 minutes under a weight of 100,000 kg in a flat press. A halter-shaped specimen having a length of 10 mm between the shoulders is punched from the film obtained in this way. This specimen is stretched in a Zwick 1445 Tensile Tester at a temperature of 130° C. at a rate of 10 mm/min until the specimen breaks. The maximum draw ratio is determined as the quotient of the length of the section of the specimen between the shoulders when breakage occurs in the specimen and the length thereof prior to stretching (10 mm). Preferably, the maximum draw ratio is at least 30 and more particularly at least 40.

The ethylene polymer according to the invention can contain non-polymer materials, such as solvents and fillers. The amount of these materials can be up to 60% by volume with respect to the ethylene polymers.

In order to improve the mechanical properties of the articles and/or to reduce the diameter of said articles, the articles according to the invention can be stretched in the conventional way. This can be effected in the solid phase, below the melting point of the thermoplastic polymer material, or in the melt phase. With regard to the stretching of UHMWPE see, for example, "Ultra high modulus Polymers", Ed. A. Ciferri and I. M. Ward, Applied Science Publishers, London (1977), p. 1–116, 321–356.

The ethylene polymer according to the invention is particularly suitable for the preparation of an article having a tensile strength of at least 1.2 GPa and a modulus of elasticity of at least 80 GPa from high molecular weight ethylene polymer, pulverulent ethylene polymer being subjected, at a temperature below the melting point of the ethylene polymer, to a pressure treatment at a pressure of at least 10 MPa, an article composed of ethylene polymer being formed, which is then stretched at a temperature of at least 100° C.

The invention will be illustrated below with the aid of illustrative embodiments. The measurement data reported in the experimental section with respect to the tensile strength ($\sigma$) and modulus of elasticity (E) were determined in accordance with ISO-527 type 2 using a clamped length of 2 cm and a stretching rate of $1.7*10^{-2} s^{-1}$.

EXPERIMENTS

Example I

A. Polymerisation

The catalyst used for the polymerisation of ethylene was a highly active Ziegler/Natta catalyst of type UM-1$^R$ from Toho Titanium. This is a titanium-containing catalyst on a support of magnesium chloride. The specific surface area of the catalyst was 6 m$^2$/g. The catalyst was used in the form of a slurry in anhydrous heptane. The concentration of the catalyst in the slurry is 0.050 g/ml.

30 Liters of dry heptane were metered, under dry nitrogen, into a polymerisation reactor which had a volume of 55 liters and was provided with a stirrer. The reactor was then heated to 60° C., with stirring (330 rpm). 30 ml of a 2 mmol/l solution of triethylaluminium in heptane was then metered in and subsequently 80.3 ml of catalyst slurry (4.047 g) was supplied. Ethylene was then introduced into the reactor until a total pressure of 0.17 MPa was obtained. The ethylene pressure was 0.07 MPa. During the polymerisation, the pressure was kept constant by supplying ethylene. After a reaction time of 127 minutes, the pressure in the reactor was let down. The slurry from the reactor was then filtered. The filtration residue was rinsed with heptane while passing through nitrogen. The powder was then dried at room temperature, successively for 12 hours under nitrogen and for 12 hours under vacuum. The yield was 3,745 g of polyethylene. The productivity was 925 g of polyethylene per g of catalyst. The bulk density was 195 kg/m$^3$. The intrinsic viscosity (IV) is 19 dl/g.

B. Analysis of the Polymer Powder

1. Maximum Draw Ratio of the Polymer Powder

A layer of ethylene polymer powder 2 mm high was compressed in a circular mould having a diameter of 5 cm for 5 minutes at room temperature under a weight of 50,000 kg. The circular film obtained was then post-pressed at 130° C. for 10 minutes under a weight of 100,000 kg in a flat press. A halter-shaped specimen having a length between the shoulders of 10 mm was punched from the film thus obtained. This specimen was stretched in a Zwick 1445 Tensile Tester at a temperature of 130° C., at a rate of 10 mm/min, until the specimen broke. The maximum draw ratio was determined as the quotient of the length of the section of the specimen between the shoulders when breakage occurs in the specimen and the length thereof prior to stretching (10 mm). The tensile strength ($\sigma$) and the modulus of elasticity (E) were determined on the stretched specimens. The maximum draw ratio was 43. The results are shown in Table 1.

2. Lamella Thickening Factor

For determination of the lamella thickening factor the polymer powders were embedded in a resin mixture of butylmethacrylate and methylmethacrylate (70:30). After fixation with RuO$_4$ in a known manner, slices having a thickness of 70 nm were cut at room temperature. Transmission electronmicroscopic (TEM) photographs were taken of the powders before and after a thermal treatment of 75 hours at 125° C. The thicknesses of the lamellae were measured on the TEM-photographs. The lamellla thickness was defined as the average thickness of 10 lamellae. The lamella thickness before thermal treatment was designated as $L_b$, the lamella thickness after thermal treatment as $L_a$. The lamella thickening factor Q was calculated using the relation: $Q=(L_a-L_b)/L_b$.

C. Processing of the Ethylene Polymer

Stretched films were prepared with the aid of a co-extrusion technique as described in L. H. Wang, S. Ottani, R. S. Porter in Polymer 1991, Volume 3, No. 10, pages 1776–81. The draw ratio (λ), the tensile strength (σ) and the modulus of elasticity (E) are shown in Table 2.

Example II

A. Polymerisation

The polymerisation was carried out as in example I. The catalyst used was a Ziegler/Natta catalyst of the Lynx 705$^R$ type from Catalyst Resources Inc. Before use as catalyst, the catalyst was ground in a Dyno-mill$^R$ until a particle size $D_{50}$ of 6.1 μm was obtained. The specific surface area of the ground catalyst was 27 m²/g. The particle size was determined with the aid of a Malvern$^R$ particle analyser. The amount of catalyst slurry metered in for the polymerisation was 0.45 g and the reaction time was 398 minutes. The yield was 4,163 g of polyethylene. The productivity was 9,251 g of polyethylene per g of catalyst. The bulk density was 254 kg/m³.

B. Analysis of the Polymer Powder

The determination was carried out as in Example I and resulted in a maximum draw ratio of 32.

C. Processing of the Polymer Powder

This was carried out in accordance with Example I. The results are given in Table 2.

Comparative Experiment A

Polymer powder of the Hostalen GUR 212$^R$ type from Hoechst was used for the analysis according to Example I, section B, and processing according to Example I, section C. The results are given in Tables 1 and 2.

Comparative Experiment B

A polymer powder was prepared and processed under the conditions indicated in Example I, but the catalyst used was a highly active titanium catalyst having a specific surface area of 223 m²/g and a Mg/Ti molar ratio of 12.7. The results are given in Tables 1 and 2.

TABLE 1

Results of examples and comparative experiments. Intrinsic viscosity (IV), bulk density (BD), specific surface area (SA), amount of catalyst residues, lamella thickening factor (Q), maximum draw ratio ($\lambda_{max}$), tensile strength (σ) and modulus of elasticity (E).

| Exp. No. | SA (m²/g) | IV (dl/g) | BD (kg/m³) | Cat. res. (ppm) | Q (–) | $\lambda_{max}$ (–) | σ (GPa) | E (GPa) |
|---|---|---|---|---|---|---|---|---|
| I | 6 | 19 | 195 | 30 | 2.1 | 43 | 0.85 | 64 |
| II | 27 | 16 | 254 | 2 | 2.1 | 32 | 0.73 | 41 |
| A | —* | 16 | 200 | 10 | 1.5 | 4 | 0.04 | 1 |
| B | 223 | 16 | 307 | 11 | 1.5 | 18 | 0.4 | 30 |

*catalyst not available

TABLE 2

Results of solid state co-extrusion

| Exp. No. | λ (–) | σ (GPa) | E (GPa) |
|---|---|---|---|
| I | 89 | 1.9 | 140 |
| II | 96 | 1.4 | 115 |
| A | 8 | 0.1 | 2 |
| B | 40 | 0.6 | 75 |

We claim:

1. A pulverulent ethylene polymer having an intrinsic viscosity of at least 4 dl/g, a maximum draw ratio of at least 20, a bulk density of at most 300 kg/m³ and having an amount of catalyst residues of less than 50 ppm.

2. A pulverulent ethylene polymer according to claim 1, wherein said draw ratio is at least 30.

3. A pulverulent ethylene polymer according to claim 1, wherein said draw ratio is at least 40.

4. A pulverulent ethylene polymer according to claim 1, wherein said draw ratio is at least 32 or 43.

5. A pulverulent ethylene polymer according to claim 1, wherein said draw ratio is 96.

6. A pulverulent ethylene polymer according to claim 1, wherein said ethylene polymer has a bulk density of at most 250 kg/m³.

7. A pulverulent ethylene polymer according to claim 1, wherein said ethylene polymer has an amount of catalyst residues of less than 25 ppm.

8. A pulverulent ethylene polymer having an intrinsic viscosity of at least 4 dl/g, a maximum draw ratio of at least 20 to about 96, a bulk density of at most 300 kg/m³ and having an amount of catalyst residues of less than 50 ppm.

9. A pulverulent ethylene polymer according to claim 8, wherein said ethylene polymer has an amount of catalyst residues of less than 25 ppm.

* * * * *